US012736204B2

(12) United States Patent
Lo

(10) Patent No.: US 12,736,204 B2
(45) Date of Patent: Sep. 15, 2026

(54) LIGHTING DEVICE AND LIGHTING BASKET WITH THE LIGHTING DEVICE

(71) Applicant: Cheng Uei Precision Industry Co., Ltd., New Taipei City (TW)

(72) Inventor: Yi Chuan Lo, New Taipei City (TW)

(73) Assignee: Cheng Uei Precision Industry Co., Ltd., New Taipei City (TW)

( * ) Notice: Subject to any disclaimer, the term of this patent is extended or adjusted under 35 U.S.C. 154(b) by 0 days.

(21) Appl. No.: 19/001,468

(22) Filed: Dec. 25, 2024

(65) Prior Publication Data

US 2025/0389409 A1 Dec. 25, 2025

(30) Foreign Application Priority Data

Jun. 20, 2024 (CN) ......................... 202421423479.5

(51) Int. Cl.

*F21V 19/00* (2006.01)
*F21V 5/00* (2018.01)
*F21V 15/01* (2006.01)
*F21V 17/00* (2006.01)
*F21V 17/06* (2006.01)
*F21W 107/13* (2018.01)

(52) U.S. Cl.

CPC .............. *F21V 17/06* (2013.01); *F21V 5/002* (2013.01); *F21V 15/01* (2013.01); *F21V 17/005* (2013.01); *F21V 19/0035* (2013.01); *F21V 19/0055* (2013.01)

(58) Field of Classification Search

CPC .............. F21W 2107/13; F21V 19/003; F21V 19/0035; F21V 19/0055

See application file for complete search history.

(56) References Cited

U.S. PATENT DOCUMENTS 11,648,871 B1 * 5/2023 Lan ...................... B60Q 1/2607 340/458
2010/0302762 A1 * 12/2010 Liu ...................... F21V 7/0083 362/147

FOREIGN PATENT DOCUMENTS

CN 210653465 U * 6/2020 ................ B62J 9/21

* cited by examiner

*Primary Examiner* — Sean P Gramling

(57) ABSTRACT

A lighting device includes a housing, a light cover and a lighting unit. The housing has a base wall, a side wall extended frontward from a periphery of the base wall, and a mounting port formed at a front end of the side wall. The housing has a tilt fixing structure extended from a front surface of the base wall. The light cover seals up the mounting port. Several portions of an inner surface of the light cover protrude inward to form a plurality of refracting cones. The plurality of the refracting cones are arranged side by side to form a refraction area. A flat light area is formed at a center of the light cover. The lighting unit is fixed to a front of the tilt fixing structure, and the lighting unit is aligned with the flat light area.

17 Claims, 12 Drawing Sheets

LIGHTING DEVICE AND LIGHTING BASKET WITH THE LIGHTING DEVICE

CROSS REFERENCE TO RELATED APPLICATIONS

The present application is based on, and claims priority from, China Patent Application No. 202421423479.5, filed Jun. 20, 2024, the disclosure of which is hereby incorporated by reference herein in its entirety.

BACKGROUND OF THE INVENTION

Field of the Invention

The present invention generally relates to a lighting device, and more particularly to a lighting device which is easy to assemble and is able to enhance a safety performance, and a lighting basket with the lighting device.

Description of Related Art

With the prevalence of an environmental protection and carbon reduction trend, the public widely uses shared bicycles with high motility performances in recent years. In order to enhance a safety of riding the shared bicycles at night or in a dim light, reflective structures and headlights are usually added to the shared bicycles or the bicycle baskets for achieving warning and lighting purposes.

Referring to FIG. 12, a common bicycle basket includes a basket 1', a reflective structure 2' installed to a front end of the basket 1', and a headlight 3' installed to a bottom of the basket 1'. The reflective structure 2' is used to reflect an external light which is an oncoming vehicle light, or a street light etc. The headlight 3' is used to illuminate a road condition, so that an oncoming vehicle is alerted to enhance a riding safety.

However, in the above-mentioned structure design, the headlight 3' which is located at the bottom of the basket 1' easily collides with a parking pile when the shared bicycle is returned, so the headlight 3' is caused to fall off or get damaged, and then the riding safety of a rider is affected. Furthermore, the reflective structure 2' and the headlight 3' need being assembled to and fixed to the basket 1', respectively. As a result, more time is consumed in an assembling process.

In view of the above-mentioned drawbacks, it is necessary to provide an innovative lighting device which includes a lamp cover and a lamp cup, and a lighting basket with the lighting device, so that the lighting device is easy to assemble and is able to enhance a safety performance.

BRIEF SUMMARY OF THE INVENTION

An object of the present invention is to provide a lighting device which is easy to assemble and is able to enhance a safety performance. The lighting device includes a housing, a light cover and a lighting unit. The housing has a base wall, a side wall extended frontward from a periphery of the base wall, and a mounting port formed at a front end of the side wall. The housing has a tilt fixing structure extended from a front surface of the base wall, and the tilt fixing structure is extended towards the mounting port. The light cover is made of a light permeable material. The light cover seals up the mounting port. Several portions of an inner surface of the light cover protrude inward to form a plurality of refracting cones. The plurality of the refracting cones are arranged side by side to form a refraction area. A flat light area is formed at a center of the light cover. The lighting unit is fixed to a front of the tilt fixing structure, and the lighting unit is aligned with the flat light area. An inclination angle is formed between a front surface of the tilt fixing structure and the base wall of the housing. After the lighting unit is fixed to the front of the tilt fixing structure, the lighting unit projects light beams obliquely downward.

Another object of the present invention is to provide a lighting basket with a lighting device. The lighting basket with the lighting device includes a basket and a lighting device. A lower portion of a front end of the basket is recessed inward to form an accommodating groove. At least one portion of a rear wall of the accommodating groove is recessed rearward to form at least one positioning hole. The rear wall of the accommodating groove is equipped with at least one locking unit. The lighting device is accommodated in the accommodating groove of the basket. The lighting device includes a housing which has a base wall. The housing has at least one positioning unit protruded outward from a rear surface of the base wall, and at least one locking part embedded in the base wall through the rear surface of the base wall. The at least one positioning unit is positioned in the at least one positioning hole. The at least one locking unit is locked with the at least one locking part.

Another object of the present invention is to provide a lighting basket with a lighting device. The lighting basket with the lighting device includes a basket and a lighting device. A lower portion of a front end of the basket is recessed inward to form an accommodating groove. The lighting device is accommodated in the accommodating groove. The lighting device includes a housing, a light cover and a lighting unit. The housing has a base wall, a side wall extended frontward from a periphery of the base wall, and a mounting port formed at a front end of the side wall. The housing has a tilt fixing structure extended from a front surface of the base wall, and the tilt fixing structure is extended towards the mounting port. The light cover seals up the mounting port. Several portions of an inner surface of the light cover protrude inward to form a plurality of refracting cones. The plurality of the refracting cones are arranged side by side to form a refraction area. A flat light area is formed at a center of the light cover. The lighting unit is fixed to a front of the tilt fixing structure, and the lighting unit is aligned with the flat light area. The lighting unit includes a circuit board, and a light cup fixed on the circuit board. The light cup is combined with the light cover.

As described above, the lighting device includes the light cover and the light cup which are combined, so that an assembly of the lighting device is simpler and more convenient. Furthermore, the lighting device not only reflects an external light source through the refraction area, but also projects the light source outward by aligning the lighting unit with the flat light area, so that functions of warning and illuminating road conditions are achieved to enhance a safety at the time of riding a bicycle. As a result, the lighting device is easy to assemble and is able to enhance the safety performance.

BRIEF DESCRIPTION OF THE DRAWINGS

The present invention will be apparent to those skilled in the art by reading the following description, with reference to the attached drawings, in which.

DETAILED DESCRIPTION OF THE INVENTION

Figure 1:
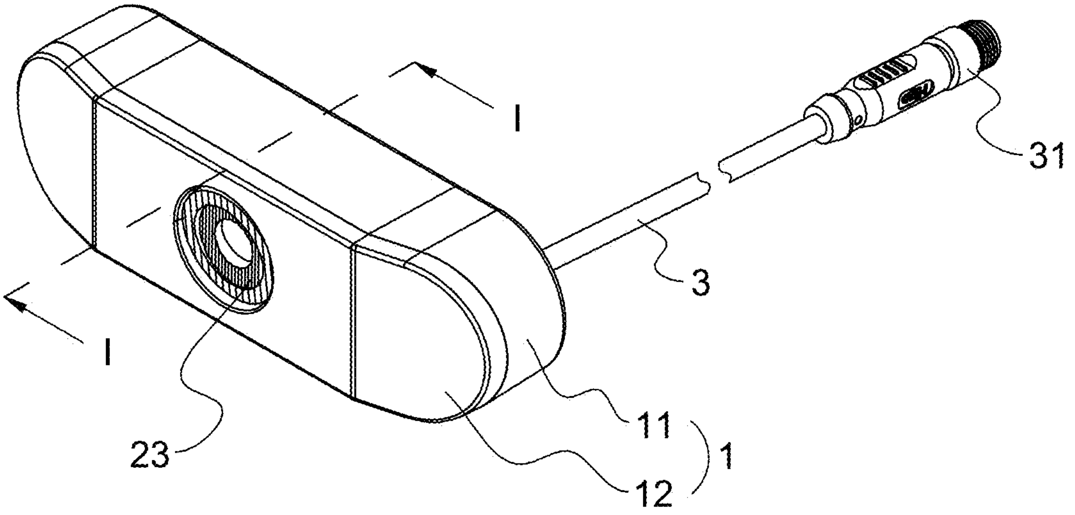
FIG. 1 is a perspective view of a lighting device in accordance with the present invention.

Referring to FIG. 1, FIG. 2, FIG. 3, FIG. 8 and FIG. 9, a lighting basket with a lighting device 300 in accordance with the present invention is shown. The lighting basket with the lighting device 300 includes a basket 200, and a lighting device 100 installed to the basket 200. The lighting device 100 includes an outer shell 1, and a lighting unit 2 arranged inside the outer shell 1.

The outer shell 1 includes a housing 11, a light cover 12 and a back cover 13. The housing 11 has a base wall 111, a side wall 112 extended frontward from a periphery of the base wall 111, and a mounting port 113 formed at a front end of the side wall 112. The back cover 13 is placed between the housing 11 and the light cover 12, and the back cover 13 is fixed to an inner surface of the light cover 12 to intensify a structure strength of the light cover 12. The light cover 12 is covered to the mounting port 113 of the housing 11, and the light cover 12 seals up the mounting port 113 of the housing 11 to combine the light cover 12 and the housing 11, so that a containing space 101 for containing the lighting unit 2 is formed between the light cover 12 and the housing 11. The light cover 12 is made of a light permeable material. Several portions of the inner surface of the light cover 12 protrude inward to form a plurality of refracting cones 121. The plurality of the refracting cones 121 are arranged side by side to form a refraction area 122, so when an external light ray enters the light cover 12 to illuminate the light cover 12, the external light ray is reflected to an outside by the refraction area 122.

Figure 6:
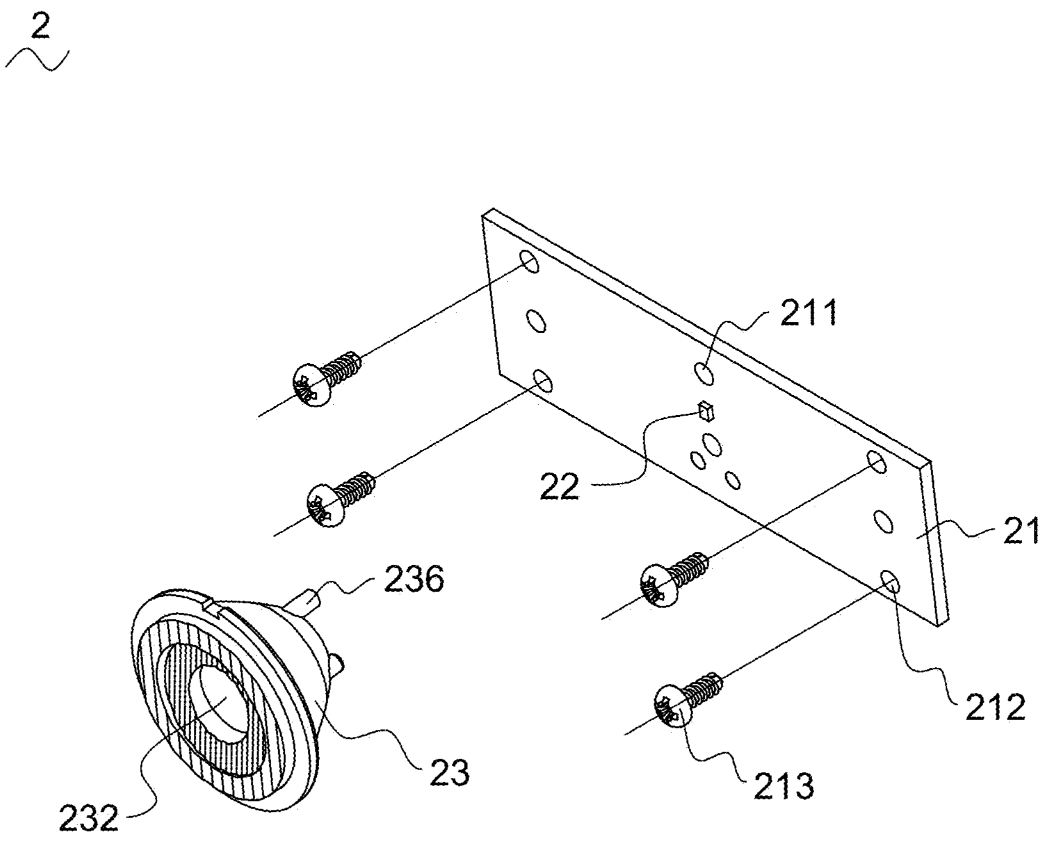
FIG. 6 is an exploded view of a lighting unit of the lighting device in accordance with the present invention.
Figure 7:
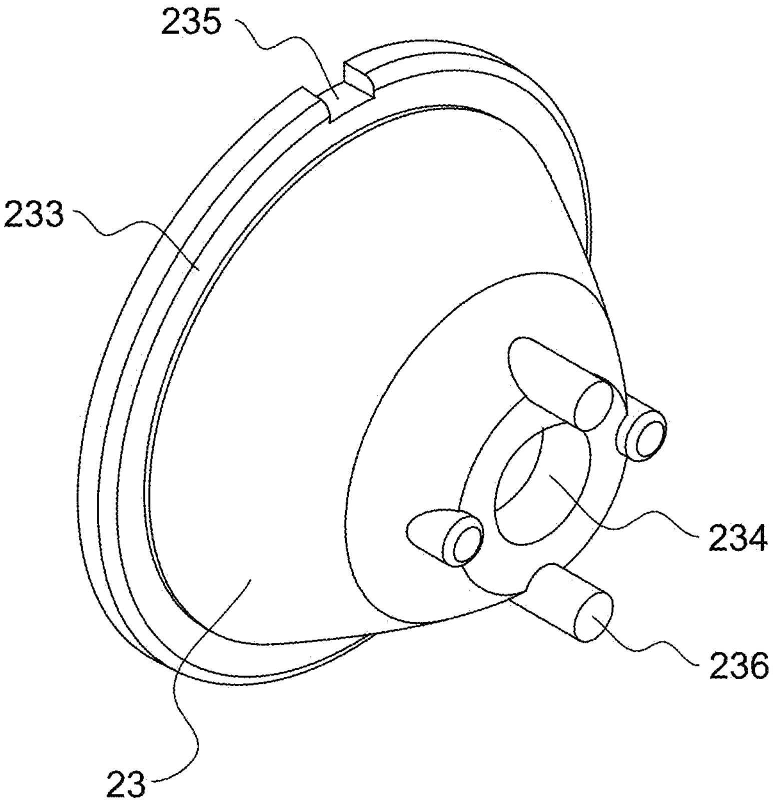
FIG. 7 is a perspective view of a light cup of the lighting device in accordance with the present invention.
Figure 8:
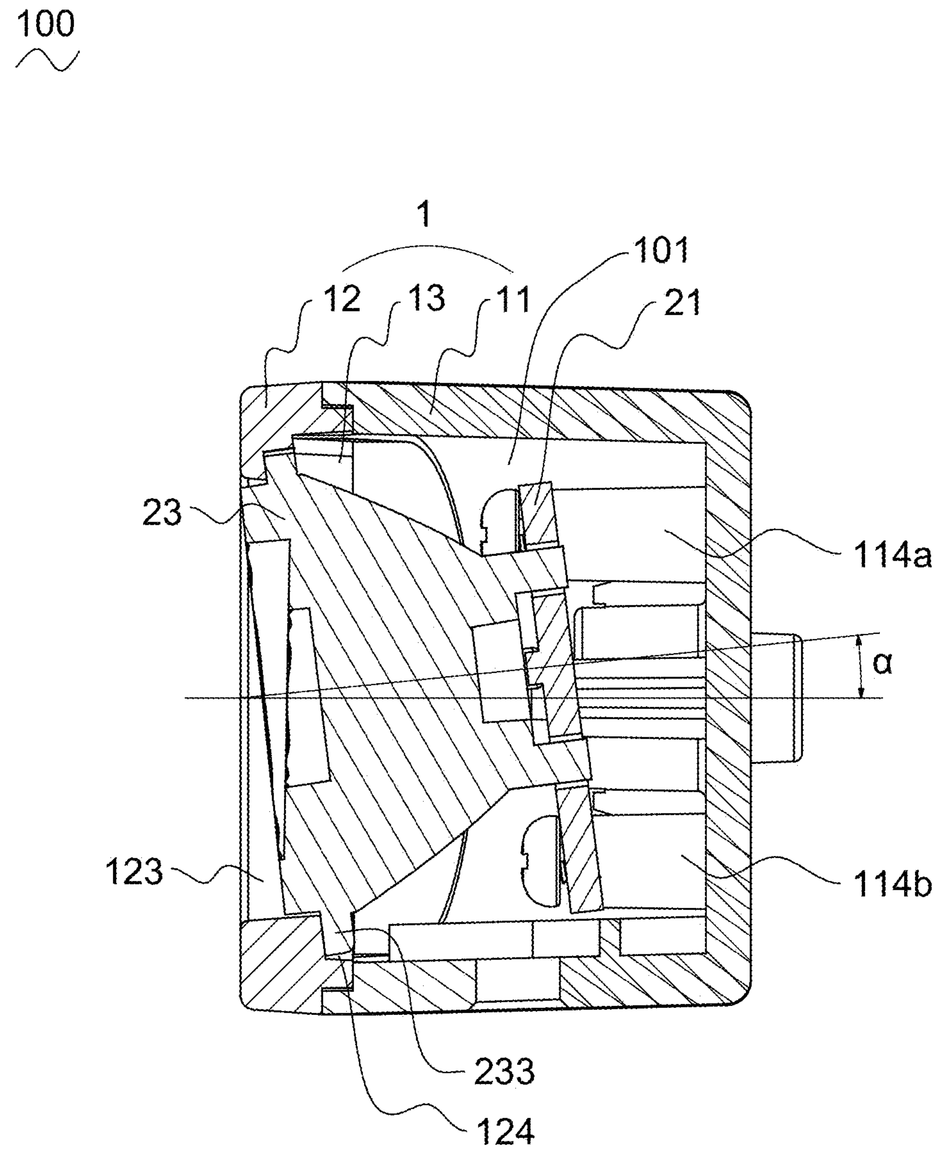
FIG. 8 is a cross-sectional view of the lighting device along a line I-I of FIG. 1.

Referring to FIG. 6 and FIG. 7, the lighting unit 2 includes a circuit board 21, a lighting element 22 arranged on the circuit board 21, and a light cup 23 fixed on the circuit board 21. The light cup 23 is combined with the light cover 12. The lighting element 22 is an emitting diode. The light cup 23 is a conical cylinder shape. The light cup 23 includes a lens 232 received in a front of the light cup 23, an outer ring 233 extended outward from a front of an outer surface of the light cup 23, and a recessing hole 234 recessed inward from a middle of a rear surface of the light cup 23. The lighting element 22 is received in the recessing hole 234, and a light source emitted by the lighting element 22 is emitted outward through the lens 232.

Figure 2:
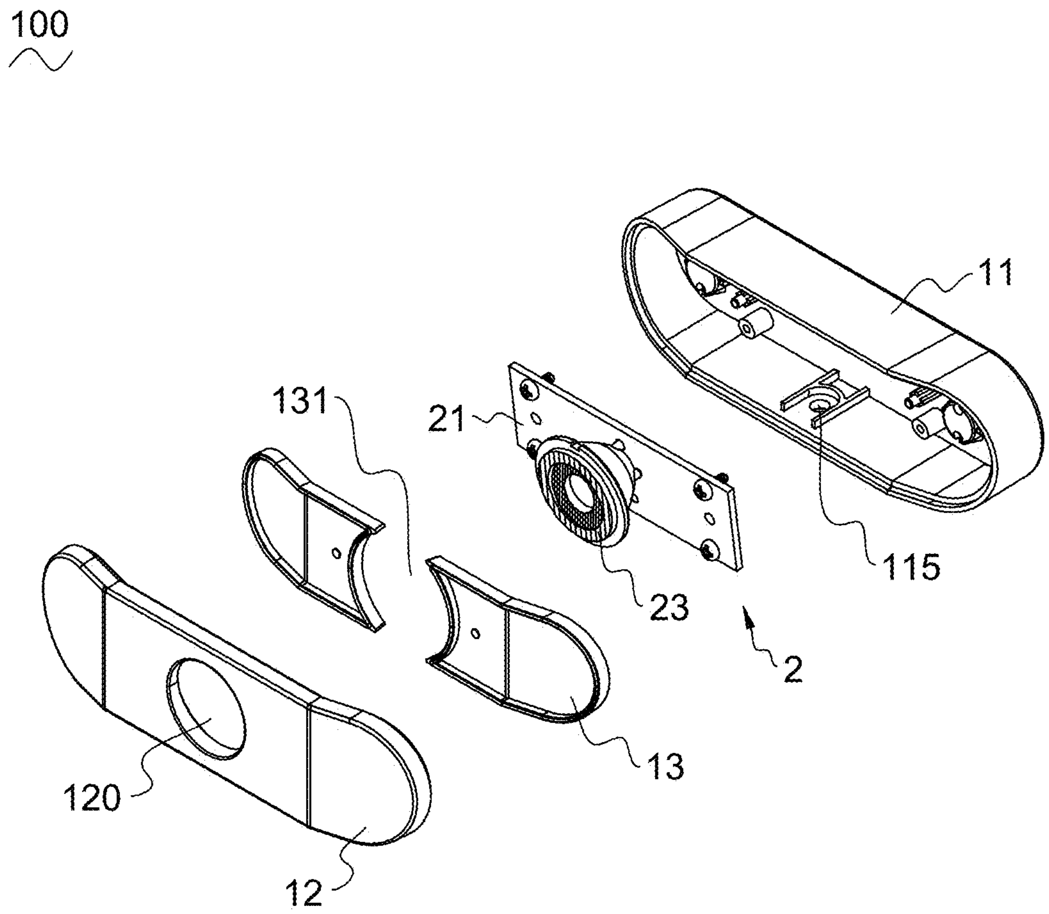
FIG. 2 is an exploded view of the lighting device in accordance with the present invention.
Figure 3:
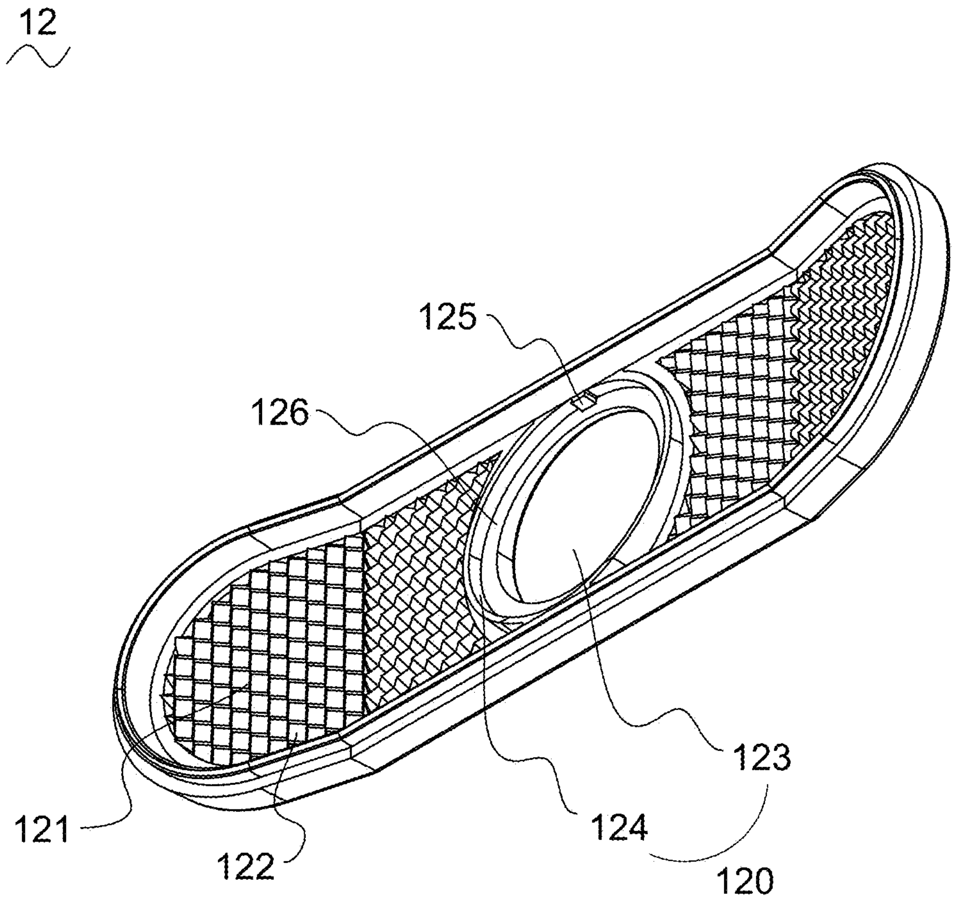
FIG. 3 is a perspective view of a light cover of the lighting device in accordance with the present invention.

Referring to FIG. 2, FIG. 3 and FIG. 7, in order to assemble the light cup 23 with the light cover 12 and the back cover 13, a flat light area 120 is formed at a center of the light cover 12. The front of the light cup 23 is aligned with the flat light area 120. The flat light area 120 emits outward a light ray emitted by the lighting unit 2. In the present invention, the flat light area 120 has a through hole 123 recessed inward in a middle of a front surface of the light cover 12, and a securing hole 124 recessed in a middle of a rear surface of the light cover 12. The through hole 123 and the securing hole 124 are connected, and the through hole 123 is communicated with the securing hole 124. A diameter of the securing hole 124 is larger than a diameter of the through hole 123. The through hole 123 is disposed to a front of a middle of the securing hole 124. A bottom of the light cup 23 is aligned with the lighting element 22, and a top of the light cup 23 is aligned with the flat light area 120.

The back cover 13 is aligned with the refraction area 122. A middle of the back cover 13 has a hollow area 131 longitudinally penetrating through the middle of the back cover 13. The hollow area 131 is aligned with the securing hole 124. A middle of the front of the light cup 23 penetrates through the hollow area 131 and the securing hole 124, and the middle of the front of the light cup 23 is received in the through hole 123. The outer ring 233 is mounted in the securing hole 124, and the outer ring 233 abuts against a rear surface of a peripheral wall of the through hole 123. In the present invention, an upper portion of an inner wall of the securing hole 124 protrudes inward to form a clipping block 125. A top of an outer surface of the outer ring 233 is recessed inward to form a clipping slot 235. The clipping block 125 is buckled in the clipping slot 235, so that the light cover 12 is limited to the light cup 23, and the light cup 23 is limited to the light cover 12.

Referring to FIG. 6, in order to fix the light cup 23 to the circuit board 21, the circuit board 21 defines at least one penetrating hole 211 longitudinally penetrating through the circuit board 21. At least one portion of a rear of the light cup 23 protrudes rearward to form at least one fixing pillar 236. The at least one fixing pillar 236 is inserted into the at least one penetrating hole 211. In order to fix the circuit board 21 in the housing 11, the housing 11 has a tilt fixing structure 114 extended from a front surface of the base wall 111, and the tilt fixing structure 114 is extended towards the mounting port 113. The lighting unit 2 is fixed to a front of the tilt fixing structure 114, and the lighting unit 2 is aligned with the flat light area 120. An inclination angle is formed between a front surface of the tilt fixing structure 114 and the base wall 111 of the housing 11.

The circuit board 21 is combined with the tilt fixing structure 114. The circuit board 21 has at least one screw hole 212, and the circuit board 21 is equipped with at least one screw bolt 213. The at least one screw bolt 213 passes through the at least one screw hole 212, the at least one screw bolt 213 is aligned with the tilt fixing structure 114 and the at least one screw bolt 213 is locked to the tilt fixing structure 114. Specifically, the circuit board 21 has a plurality of the screw holes 212, and the circuit board 21 is equipped with a plurality of the screw bolts 213. The plurality of the screw bolts 213 pass through the plurality of the screw holes 212, the plurality of the screw bolts 213 are aligned with the tilt fixing structure 114, and the plurality of the screw bolts 213 are locked to the tilt fixing structure 114.

Figure 4:
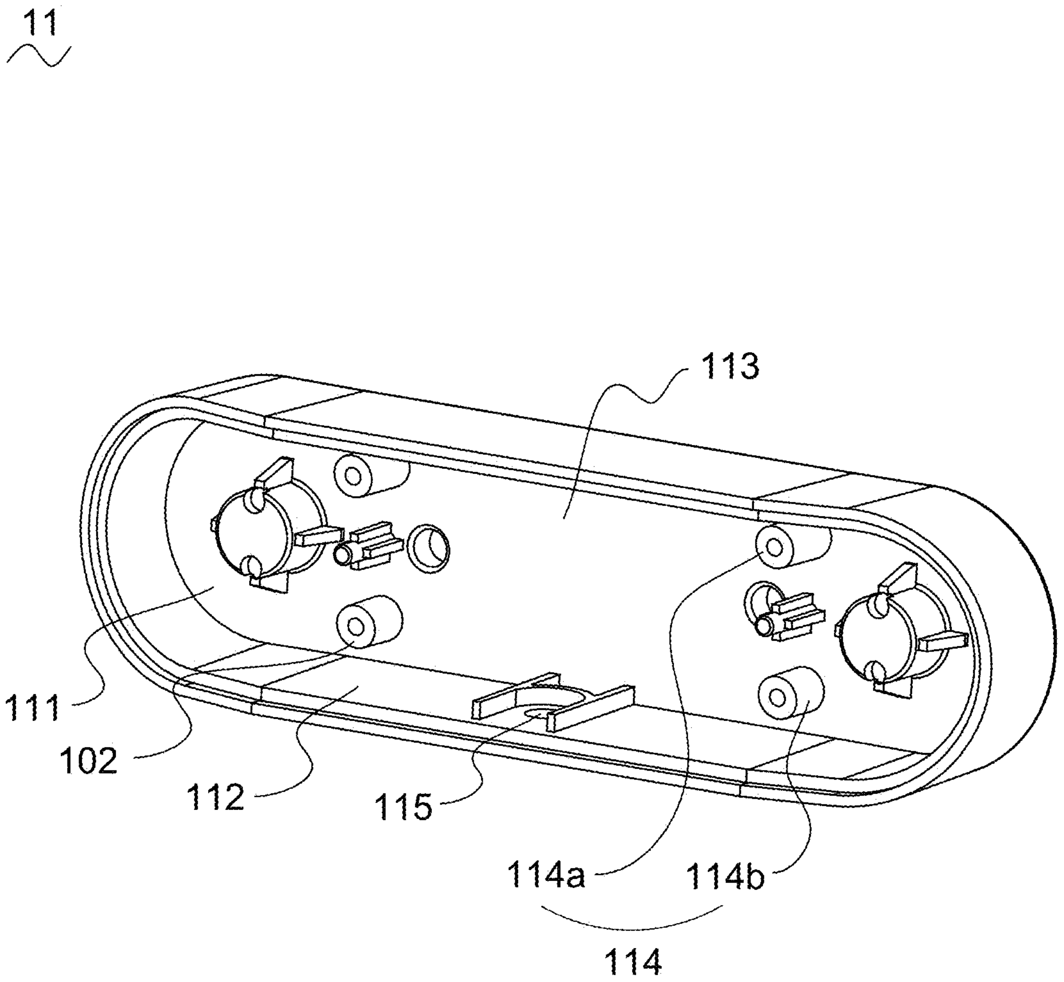
FIG. 4 is a perspective view of a housing of the lighting device in accordance with the present invention.

Referring to FIG. 1 and FIG. 4, a lower portion of the side wall 112 defines a connecting hole 115 penetrating through the lower portion of the side wall 112 along an up-down direction. The lighting device 100 includes a transmitting cable 3, and a connector 31 arranged at one end of the transmitting cable 3. The lighting unit 2 is connected with the other end of the transmitting cable 3. A free end of the transmitting cable 3 is connected with the connector 31. The transmitting cable 3 is connected to the circuit board 21, and the connector 31 penetrates outward through the connecting hole 115. The connector 31 is connected with a power supply unit (not shown) to provide electric power for the lighting device 100.

An assembling process of the lighting device 100 according to the present invention is described as follows. At first, the back cover 13 is fixed to the inner surface of the light cover 12 by a glue dispensing way, and the light cup 23 is fixed with the flat light area 120 by the glue dispensing way. The clipping block 125 is buckled into the clipping slot 235 to intensify a limitation between the light cover 12 and the light cup 23. Then, the circuit board 21 is locked to the tilt fixing structure 114 of the housing 11 by the at least one screw bolt 213, and the transmitting cable 3 penetrates outward through the connecting hole 115. The recessing hole 234 is aligned with the lighting element 22. The at least one fixing pillar 236 is inserted into the at least one penetrating hole 211 to assemble the light cup 23 to the circuit board 21. At last, the light cover 12 is combined with the housing 11 by the glue dispensing way to complete an assembly of the lighting device 100.

Figure 5:
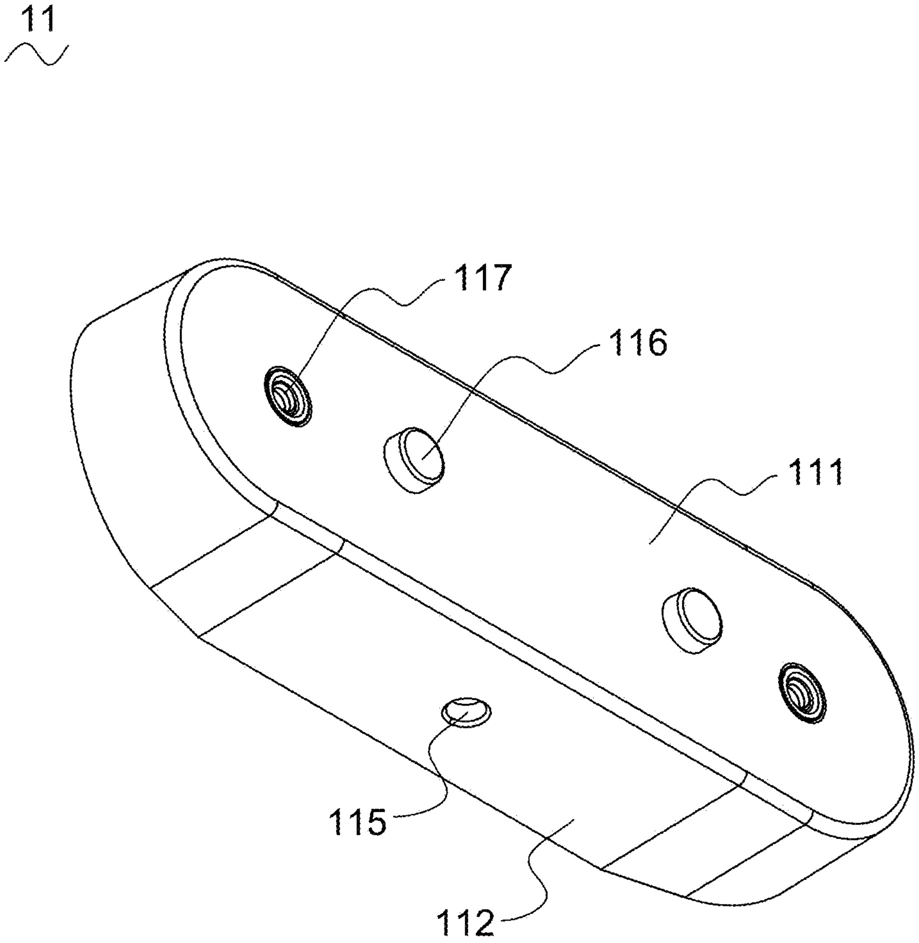
FIG. 5 is another perspective view of the housing of the lighting device in accordance with the present invention.
Figure 9:
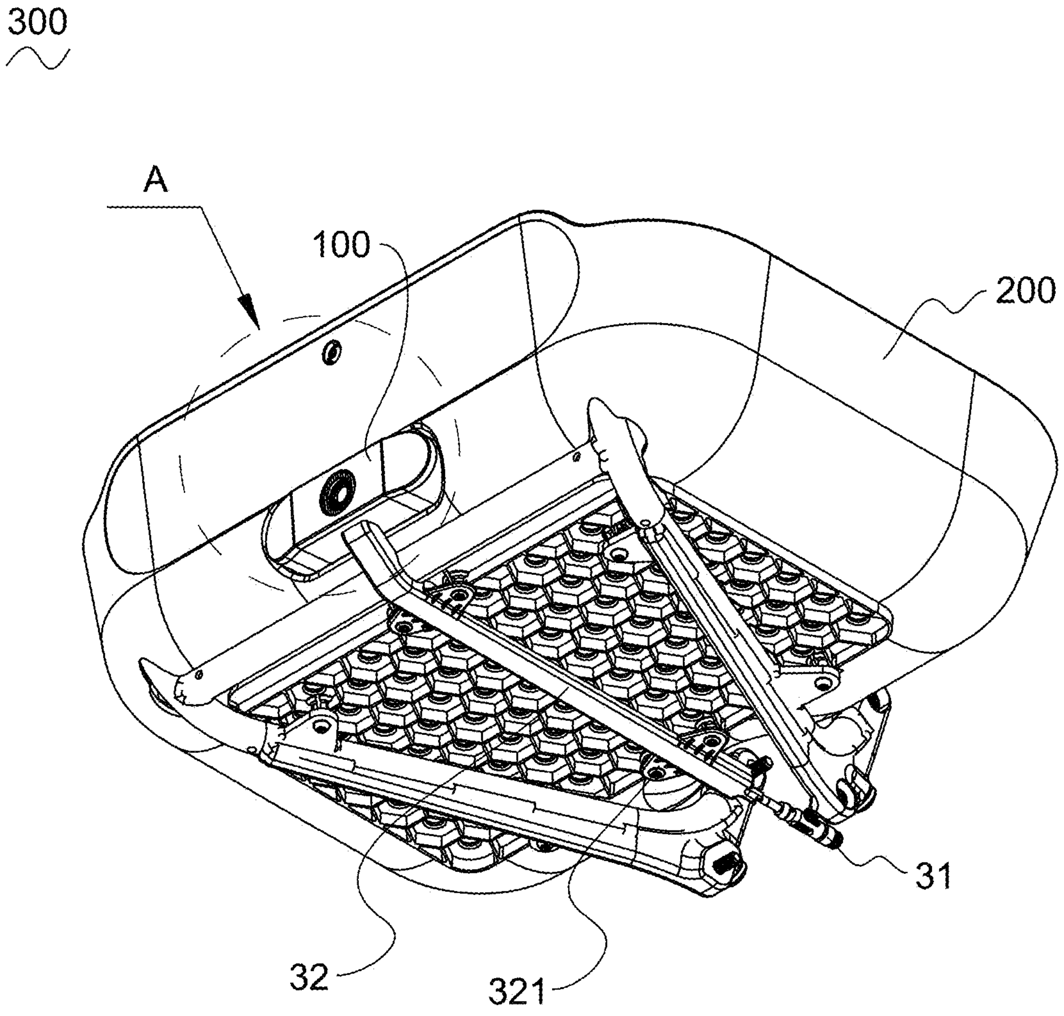
FIG. 9 is a perspective view of a lighting basket with the lighting device in accordance with the present invention.
Figure 10:
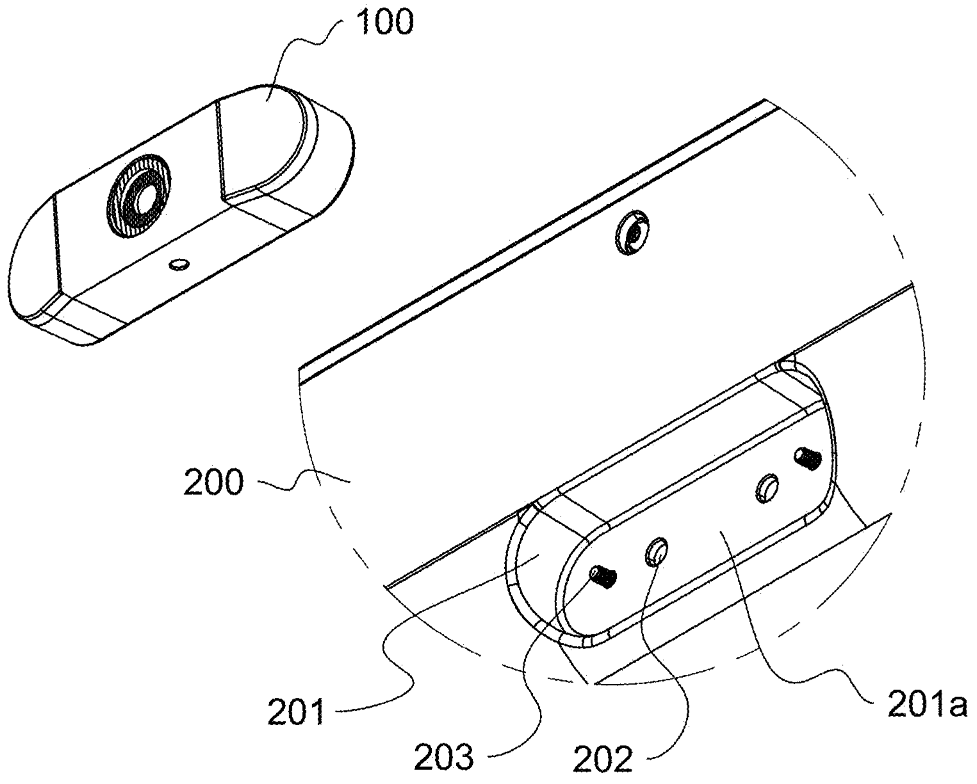
FIG. 10 is a partial exploded view of an encircled portion A of the lighting basket with the lighting device of FIG. 9.
Figure 11:
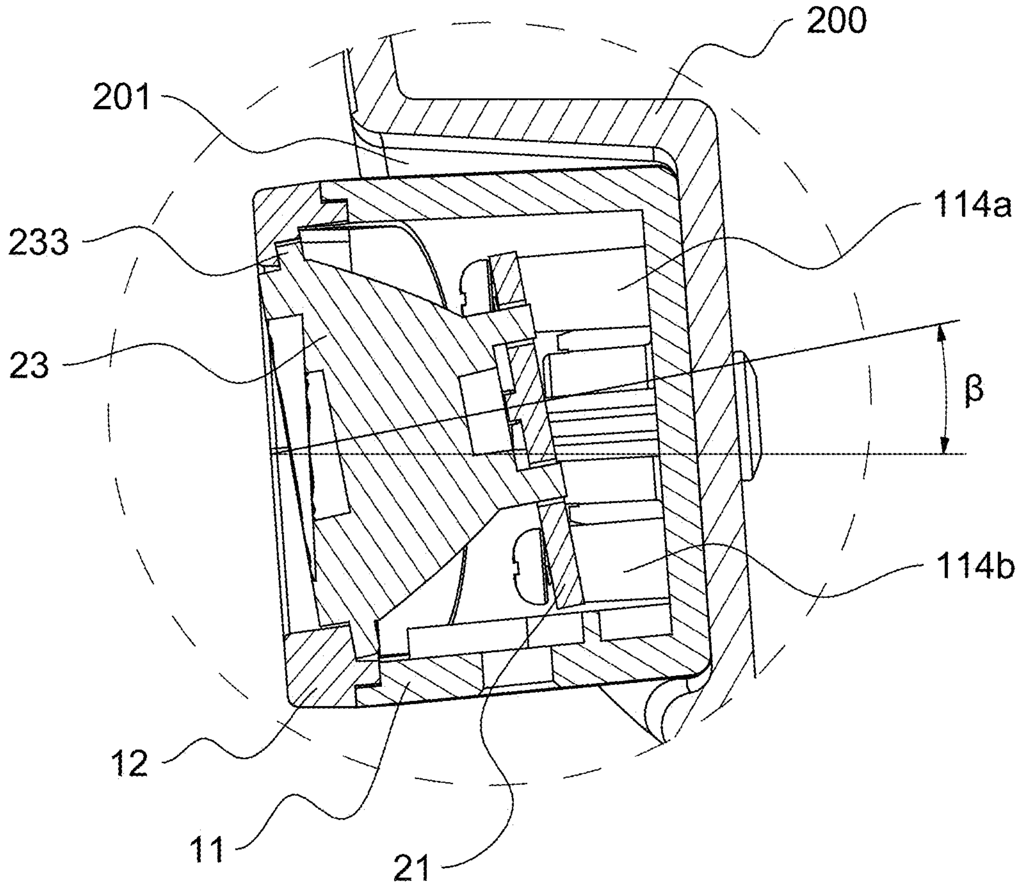
FIG. 11 is a partial cross-sectional view of the encircled portion A of the lighting basket with the lighting device of FIG. 9.
Figure 12:
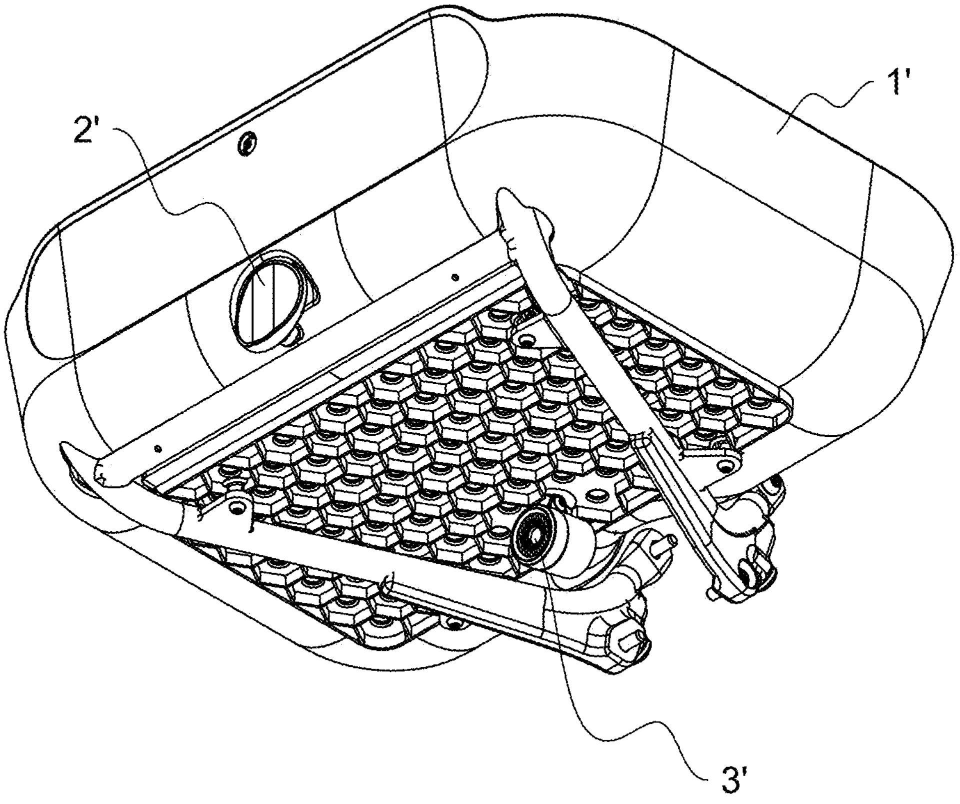
FIG.12 (Prior Art)
FIG. 12 is a schematic diagram of a common bicycle basket, wherein a reflective structure and a headlight are installed to the common bicycle basket in prior art.

Referring to FIG. 5, FIG. 9 and FIG. 10, in a concrete implementation, the lighting device 100 is installed to the basket 200 of a shared bicycle (not shown). The shared bicycle has the power supply unit. The transmitting cable 3 extends to a bottom of the basket 200, and then the connector 31 is connected to the power supply unit of the shared bicycle for providing the electric power. In order to prevent the transmitting cable 3 from being cut and stolen, a protective shell 32 is installed on an outer surface of the transmitting cable 3. A front end of the protective shell 32 covers the connecting hole 115, and at least one mounting part 321 is extended from two sides of the protective shell 32. The at least one mounting part 321 is fixed to the bottom of the basket 200. Additionally, a lower portion of a front end of the basket 200 is recessed inward to form an accommodating groove 201 for accommodating the lighting device 100. The lighting device 100 is accommodated in the accommodating groove 201 of the basket 200. In order to assemble the lighting device 100 in the accommodating groove 201, the housing 11 has at least one positioning unit 116 protruded outward from a rear surface of the base wall 111, and at least one locking part 117 embedded in the base wall 111 through the rear surface of the base wall 111. At least one portion of a rear wall of the accommodating groove 201 is recessed rearward to form at least one positioning hole 202. The at least one positioning unit 116 is combined with the at least one positioning hole 202. The at least one positioning unit 116 is positioned in the at least one positioning hole 202. The rear wall of the accommodating groove 201 is equipped with at least one locking unit 203. The at least one locking unit 203 is aligned with the at least one locking part 117. The at least one locking unit 203 is locked with the at least one locking part 117.

Referring to FIG. 4 to FIG. 11, an inner surface of the rear wall of the accommodating groove 201 is inclined downward and rearward to form a posterior surface 201*a*. An inclined angle of the posterior surface 201*a* which is relative to a horizontal direction is four degrees. In order to make the lighting device 100 be able to balance a front illumination and a ground illumination, the front of the tilt fixing structure 114 of the housing 11 is tilted downward and rearward to form a tilted angle. After the lighting unit 2 is fixed to the front of the tilt fixing structure 114, the lighting unit 2 projects light beams obliquely downward to illuminate both a front place and a horizontal ground simultaneously. Furthermore, an angle $\alpha$ is formed between an axis of the light cup 23 and the horizontal ground, and preferably, the angle $\alpha$ is six degrees. Therefore, when the light cup 23 is assembled into the accommodating groove 201, the base wall 111 of the housing 11 of the lighting device 100 is attached to the posterior surface 201*a*, and an angle $\beta$ is formed between the axis of the light cup 23 and the horizontal ground. In the present invention, the angle $\beta$ is ten degrees. In this way, the light source projected by the lighting device 100 to achieve a better illumination visibility and enhance a driving safety.

The tilt fixing structure 114 includes at least one first pillar 114*a* and at least one second pillar 114*b*. A length of the at least one first pillar 114*a* is longer than a length of the at least one second pillar 114*b*. A front surface of the at least one first pillar 114*a* and a front surface of the at least one second pillar 114*b* are inclined downward and rearward to form at least two bevels 102 with the same slope. The lighting unit 2 is slantwise disposed at the at least two bevels 102.

Referring to FIG. 3 to FIG. 8, the tilt fixing structure 114 includes two first pillars 114*a* and two second pillars 114*b*. A length of each first pillar 114*a* is longer than a length of each second pillar 114*b*. A front surface of each first pillar 114*a* and a front surface of each second pillar 114*b* are inclined downward and rearward to form two bevels 102 with the same slope. The circuit board 21 is obliquely disposed in the housing 11 along the bevels 102 of the two first pillars 114*a* and the two second pillars 114*b*, so that the light cup 23 and the circuit board 21 are obliquely mounted in the housing 11. In order to make the inclined light cup 23 be placed in the light cover 12, a rear surface of an outer wall of the through hole 123 is defined as a holding surface 126, and the holding surface 126 is formed between the outer wall of the through hole 123 and an inner wall of the securing hole 124. The holding surface 126 is parallel to the front surface of the tilt fixing structure 114. The holding surface 126 is parallel to the circuit board 21 which is fastened at the tilt fixing structure 114, and the outer ring 233 abuts against the inner wall of the securing hole 124 and the holding surface 126.

As described above, the lighting device 100 includes the light cover 12 and the light cup 23 which are combined, so that the assembly of the lighting device 100 is simpler and more convenient. Furthermore, the lighting device 100 not only reflects the external light source through the refraction area 122, but also projects the light source outward by aligning the lighting unit 2 with the flat light area 120, so that functions of warning and illuminating road conditions are achieved to enhance a safety at the time of riding a bicycle. As a result, the lighting device 100 is easy to assemble and is able to enhance a safety performance.

What is claimed is:

1. A lighting device, comprising:

a housing having a base wall, a side wall extended frontward from a periphery of the base wall, and a mounting port formed at a front end of the side wall, the housing having a tilt fixing structure extended from a front surface of the base wall, and the tilt fixing structure being extended towards the mounting port;

a light cover made of a light permeable material, the light cover sealing up the mounting port, several portions of an inner surface of the light cover protruding inward to form a plurality of refracting cones, the plurality of the refracting cones being arranged side by side to form a refraction area, a flat light area being formed at a center of the light cover; and a lighting unit fixed to a front of the tilt fixing structure, and the lighting unit being aligned with the flat light area, wherein the tilt fixing structure includes at least one first pillar and at least one second pillar, a length of the at least one first pillar is longer than a length of the at least one second pillar, a front surface of the at least one first pillar and a front surface of the at least one second pillar are inclined downward and rearward to form at least two bevels with a same slope, the lighting unit is slantwise disposed at the at least two bevels, an inclination angle is formed between a front surface of the tilt fixing structure and the base wall of the housing, and after the lighting unit is fixed to the front of the tilt fixing structure, the lighting unit projects light beams obliquely downward.

2. The lighting device as claimed in claim 1, wherein the lighting unit includes a circuit board, a lighting element arranged on the circuit board, and a light cup fixed on the circuit board, the circuit board is combined with the tilt fixing structure, a bottom of the light cup is aligned with the lighting element, and a top of the light cup is aligned with the flat light area.

3. The lighting device as claimed in claim 2, wherein the flat light area has a through hole recessed inward in a middle of a front surface of the light cover, and a securing hole recessed in a middle of a rear surface of the light cover, a diameter of the securing hole is larger than a diameter of the through hole, the through hole and the securing hole are connected, and the through hole is communicated with the securing hole.

4. The lighting device as claimed in claim 3, wherein a rear surface of an outer wall of the through hole is defined as a holding surface, and the holding surface is formed between the outer wall of the through hole and an inner wall of the securing hole, the holding surface is parallel to the front surface of the tilt fixing structure, the light cup includes an outer ring extended outward from a front of an outer surface of the light cup, the outer ring is mounted in the securing hole, the outer ring abuts against the inner wall of the securing hole and the holding surface.

5. The lighting device as claimed in claim 4, wherein an upper portion of the inner wall of the securing hole protrudes inward to form a clipping block, a top of an outer surface of the outer ring is recessed inward to form a clipping slot, the clipping block is buckled in the clipping slot.

6. The lighting device as claimed in claim 5, further comprising an outer shell, the outer shell including a back cover, the back cover being placed between the housing and the light cover, and the back cover being fixed to an inner surface of the light cover, the back cover being aligned with the refraction area, a middle of the back cover having a hollow area longitudinally penetrating through the middle of the back cover, the hollow area being aligned with the securing hole, a middle of a front of the light cup penetrating through the hollow area and the securing hole, and the middle of the front of the light cup being received in the through hole.

7. A lighting basket with a lighting device, comprising:

a basket, a lower portion of a front end of the basket being recessed inward to form an accommodating groove, at least one portion of a rear wall of the accommodating groove being recessed rearward to form at least one positioning hole, the rear wall of the accommodating groove being equipped with at least one locking unit; and a lighting device accommodated in the accommodating groove of the basket, the lighting device including a housing which has a base wall, the housing having at least one positioning unit protruded outward from a rear surface of the base wall, and at least one locking part embedded in the base wall through the rear surface of the base wall, the at least one positioning unit being positioned in the at least one positioning hole, the at least one locking unit being locked with the at least one locking part.

8. The lighting basket with the lighting device as claimed in claim 7, wherein an inner surface of the rear wall of the accommodating groove is inclined downward and rearward to form a posterior surface, the base wall of the housing of the lighting device is attached to the posterior surface.

9. The lighting basket with the lighting device as claimed in claim 7, wherein the at least one positioning unit is combined with the at least one positioning hole, the at least one locking unit is aligned with the at least one locking part.

10. The lighting basket with the lighting device as claimed in claim 7, wherein the housing has a tilt fixing structure extended from a front surface of the base wall, the tilt fixing structure includes at least one first pillar and at least one second pillar, a length of the at least one first pillar is longer than a length of the at least one second pillar, a front surface of the at least one first pillar and a front surface of the at least one second pillar are inclined downward and rearward to form at least two bevels with the same slope, the lighting device includes an outer shell, and a lighting unit arranged inside the outer shell, the lighting unit is slantwise disposed at the at least two bevels.

11. The lighting basket with the lighting device as claimed in claim 10, wherein the lighting unit includes a circuit board, a lighting element arranged on the circuit board, and a light cup fixed on the circuit board, the lighting device includes a light cover covered to the housing, a flat light area is formed at a center of the light cover, the circuit board is combined with the tilt fixing structure, a bottom of the light cup is aligned with the lighting element, and a top of the light cup is aligned with the flat light area.

12. The lighting basket with the lighting device as claimed in claim 11, wherein the flat light area has a through hole recessed inward in a middle of a front surface of the light cover, and a securing hole recessed in a middle of a rear surface of the light cover, a diameter of the securing hole is larger than a diameter of the through hole, the through hole and the securing hole are connected, and the through hole is communicated with the securing hole.

13. The lighting basket with the lighting device as claimed in claim 12, wherein a rear surface of an outer wall of the through hole is defined as a holding surface, and the holding surface is formed between the outer wall of the through hole and an inner wall of the securing hole, the holding surface is parallel to a front surface of the tilt fixing structure, the light cup includes an outer ring extended outward from a front of an outer surface of the light cup, the outer ring is mounted in the securing hole, the outer ring abuts against the inner wall of the securing hole and the holding surface.

14. The lighting basket with the lighting device as claimed in claim 12, wherein an upper portion of an inner wall of the securing hole protrudes inward to form a clipping block, the light cup includes an outer ring extended outward from a front of an outer surface of the light cup, a top of an outer surface of the outer ring is recessed inward to form a clipping slot, the clipping block is buckled in the clipping slot.

15. The lighting basket with the lighting device as claimed in claim 12, wherein the outer shell includes a back cover placed between the housing and the light cover, the back cover is fixed to an inner surface of the light cover, several portions of an inner surface of the light cover protrude inward to form a plurality of refracting cones, the plurality of the refracting cones are arranged side by side to form a refraction area, the back cover is aligned with the refraction area, a middle of the back cover has a hollow area longitudinally penetrating through the middle of the back cover, the hollow area is aligned with the securing hole, a middle of a front of the light cup penetrates through the hollow area and the securing hole, and the middle of the front of the light cup is received in the through hole.

16. The lighting basket with the lighting device as claimed in claim 10, wherein the lighting device includes a transmitting cable, and a connector arranged at one end of the transmitting cable, the lighting unit is connected with the other end of the transmitting cable, the housing has a side wall extended frontward from a periphery of the base wall, a lower portion of the side wall defines a connecting hole penetrating through the lower portion of the side wall along an up-down direction, a protective shell is installed on an outer surface of the transmitting cable, a front end of the protective shell covers the connecting hole, and at least one mounting part is extended from two sides of the protective shell, the transmitting cable penetrates outward through the connecting hole, the transmitting cable extends to a bottom of the basket, the at least one mounting part is fixed to the bottom of the basket.

17. A lighting basket with a lighting device, comprising:

a basket, a lower portion of a front end of the basket being recessed inward to form an accommodating groove; and a lighting device accommodated in the accommodating groove, the lighting device including:

a housing having a base wall, a side wall extended frontward from a periphery of the base wall, and a mounting port formed at a front end of the side wall, the housing having a tilt fixing structure extended from a front surface of the base wall, and the tilt fixing structure being extended towards the mounting port, a light cover sealing up the mounting port, several portions of an inner surface of the light cover protruding inward to form a plurality of refracting cones, the plurality of the refracting cones being arranged side by side to form a refraction area, a flat light area being formed at a center of the light cover, and a lighting unit fixed to a front of the tilt fixing structure, and the lighting unit being aligned with the flat light area, the lighting unit including a circuit board, and a light cup fixed on the circuit board, the light cup being combined with the light cover.

* * * * *